United States Patent
Arms et al.

[19]

[11] Patent Number: 5,914,593
[45] Date of Patent: Jun. 22, 1999

[54] TEMPERATURE GRADIENT COMPENSATION CIRCUIT

[75] Inventors: Steven W. Arms, Williston; Christopher P. Townsend, Shelburne, both of Vt.

[73] Assignee: Micro Strain Company, Inc., Burlington, Vt.

[21] Appl. No.: 09/110,513

[22] Filed: Jul. 6, 1998

Related U.S. Application Data

[63] Continuation-in-part of application No. 08/590,835, Jan. 24, 1996, Pat. No. 5,777,467, which is a continuation-in-part of application No. 08/078,467, Jun. 21, 1993, Pat. No. 5,497,147.

[51] Int. Cl.$^6$ .......................... G01B 7/00; G01R 33/025; G01N 27/72
[52] U.S. Cl. .............. 324/207.12; 324/225; 324/207.19; 73/779
[58] Field of Search .............................. 324/207.12, 225, 324/209, 207.15, 207.16, 207.19, 207.24, 234, 236, 669, 670; 73/766, 779; 600/587, 595

[56] References Cited

U.S. PATENT DOCUMENTS 5,777,468  7/1998  Maher ................................. 324/207.12

*Primary Examiner*—Walter E. Snow
*Attorney, Agent, or Firm*—Thomas N. Neiman

[57] ABSTRACT

The novel temperature gradient compensation circuit is designed to overcome temperature gradient problems in inductive or capacitive circuits, such as, differential variable reluctance transducers. The system comprises, in one embodiment, the use of an inductive or alternating current bridge which sends its output to a low pass filter in order to remove the alternating current component of the bridge output. The output of the low pass filter is fed into an instrumentation amplifier whose gain can be adjusted. The output of this instrumentation amplifier is a signal that is proportional to the temperature gradient experienced by the alternating current bridge. The output of the alternating current bridge is also fed to a high pass filter and then sent to a demodulator and amplifier. By subtracting the direct current output from the alternating current output, the effects of temperature do not have an effect upon the result.

8 Claims, 4 Drawing Sheets

TEMPERATURE GRADIENT COMPENSATION CIRCUIT

This is a continuation in part application based upon the utility patent application Ser. No. 08/590,835 filed on Jan. 24, 1996 and currently, which will mature into a patent on Jul. 7, 1998 as U.S. Pat. No. 5,777,467. Pat. No. 5,777,467 was a continuation in part application based upon the utility patent application Ser. No. 08/078,467 filed on Jun. 21, 1993 which matured into U.S. Pat. No. 5,497,147 issued on Mar. 5, 1996.

BACKGROUND OF THE INVENTION

This invention pertains to devices for measuring displacement, and, in particular, to an improved miniature differential variable reluctance transducer assembly for use in environments where a temperature gradient may exist, and for use in hard to reach areas.

There have been a number of attempts to develop highly accurate miniaturized sensors to be used by industry to measure displacement, elongation, and strain. Examples of these type of devices include U.S. Pat. No. 4,813,435 issued to Steven W. Arms on Mar. 21, 1989, based on Hall Effect sensors. Other attempts in this area include the U.S. patents issued to Robert W. Redlich, U.S. Pat. No. 4,667,158 issued on May 19, 1987 and to Alec H. Seilly, U.S. Pat. No. 4,350,954 issued on September 1982. However, these devices do not describe a method for removing errors in measurement that may be caused by temperature gradients across the transducer assembly.

The effect of temperature on inductive transducers limits their overall absolute accuracy. Inductive transducers are often designed so the measurement is made using a differential pair of coils. In this manner, the effect of temperature can theoretically be canceled, since the output signal is the difference between the output of two coils, and temperature changes that both coils experience equally is theoretically subtracted out. However, if one coil experiences a different temperature environment than the other coil, a signal proportional to the temperature gradient between the two coils will appear at the circuit output, significantly reducing absolute accuracy.

Typically the inductance is measured by using an AC excitation to drive the inductive AC bridge, and a synchronous demodulator (or other rectification means) to convert the AC signal into a DC output proportional to the physical signal of interest. The problem with this method is that it also measures any changes in DC resistance of the coil. The DC resistance of the coil is proportional to temperature, and any temperature gradients between the coils will cause an error in the measurement.

Workers in the measurement sciences field have described methods of improving measurement accuracy in the face of temperature influences; one such technique measures transducer temperature using thermoelectric voltages (Anderson, U.S. Pat. No. 5,481,199, issued on Jan. 2, 1996). However, Anderson's method requires the use of thermocouple conductors rather than the conventional copper wire used in most inductive coil assemblies. Shozo & Shinzi (Japanese Patent no. 09145495, issued on Jun. 1, 1997) described a temperature correcting device for magnetostrictive sensors which relies on a temperature sensitive diode with positive temperature characteristic to compensate for errors in the magnetostrictive sensor which has a negative temperature characteristic. These techniques rely on the addition of specialized temperature sensing materials or devices in order to achieve compensation.

In the field of flaw or crack detection it is well known that coils may be employed to induce magnetic fields in the material or structure to be tested (target). The imposed magnetic fields induce eddy currents in the target, which results in a change in impedance in the interrogation coil(s), and which may be modulated by the presence of a flaw. These methods may also be employed to construct non-contacting proximity and displacement sensors, which typically employ one or more coils and a conductive or ferrous target. Sugiyama et al. (European Patent no. 0 181 512 B1, issued Aug. 21, 1991) describe a technique for varying the depth of penetration of eddy currents in a target material by controlling both the AC excitation frequency and DC magnetic field intensity. However, Sugiyama et al. do not describe a method for compensation of thermal errors, and furthermore, they utilized separate terminals for connection of the AC and DC excitation sources to the interrogation probe.

It is the object of this invention to teach an elegant circuit for use with inductive sensors which avoids the disadvantages of and limitations of previous systems, and addresses the needs of linear position sensing in a temperature gradient environment. This invention describes a novel circuit which compensates for the effect of temperature gradients on inductive displacement transducers, but may also be applied to other types of reactive sensors. Unlike previous methods, no special temperature detecting devices, materials, or additional terminals are required in order to perform the compensation; this feature reduces system complexity, and therefore, lowers system cost.

The benefit of this circuit is especially important for miniature sensors, which exhibit high DC resistance relative to the reactive (AC resistance) component of the sensor impedance, and therefore, are more sensitive to temperature fluctuations and gradients. In addition, a method for deriving the absolute temperature of the sensor is described. This allows the inductive sensor to also serve as a temperature sensor. This signal may provide for further signal compensation or control functions without the requirement of additional temperature sensing elements. The invention described herein has applications in improved accuracy linear displacement sensing, non-contact position and proximity sensing, and eddy current sensing. Furthermore, the novel temperature compensation circuit may be combined with an inductive (or reactive) displacement sensor and appropriate structural spring element (or structure), to realize improved force, torque and acceleration transducers.

SUMMARY OF THE INVENTION

It is the object of this invention to teach a temperature gradient compensation circuit, for use in the measurement of circuit impedance's such as inductance for use in sensors and transducers used in medical and industrial research applications to measure strains and displacement in inaccessible areas where temperature gradient may exist, comprising an impedance bridge circuit; said impedance bridge circuit having at least two power supplies, each with a different frequency; said impedance bridge circuit further having a low pass filter for removing the signal generated by the higher frequency power supply; said impedance bridge circuit further having a high pass filter for removing the signal generated by the lower frequency filter supply; said impedance bridge filter further having a demodulator positioned after each of said filters to convert the alternating current signal into a direct current signal proportional to the magnitude of the alternating current signal; and means for measuring the difference from the output of the demodulators.

BRIEF DESCRIPTION OF THE INVENTION

Further objects and features of this invention will become more apparent by reference to the following description taken in conjunction with the following figures, in which.

DETAILED DESCRIPTION OF THE PREFERRED EMBODIMENTS

Figure 1:
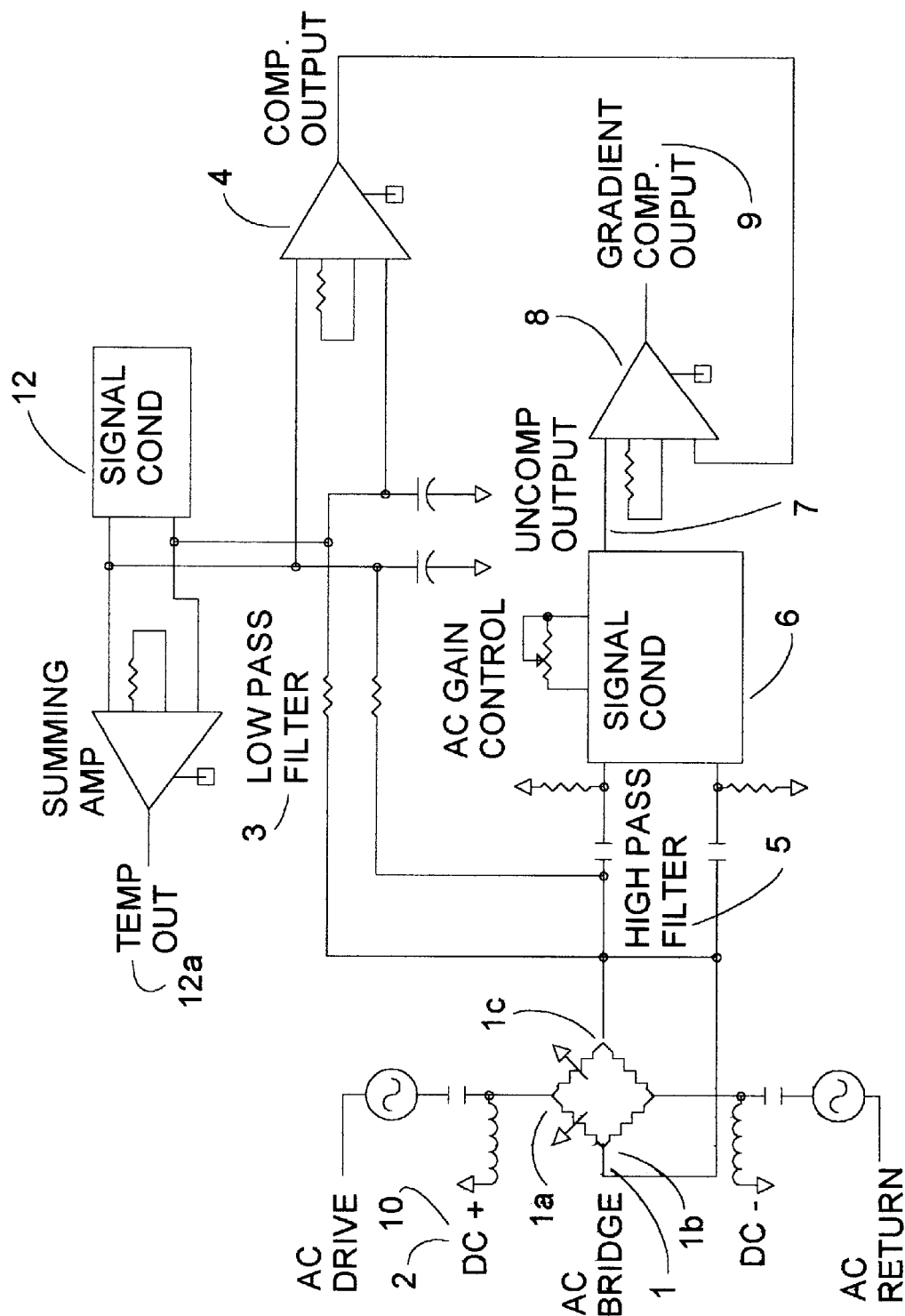
FIG. 1 is a circuit diagram of the novel temperature gradient compensation circuit.

Referring to FIG. 1, if the inductive or AC bridge (1) is also driven with DC current from a DC power supply (2), then we are able to measure the effect of temperature gradients independently of the change in inductance of the coil. The output of the bridge is routed to a low pass filter (3) to remove the AC signal component of the bridge output. The output of the low pass filter is fed into an instrumentation amplifier (4) whose gain can be adjusted. The output of this instrumentation amplifier is a signal that is proportional to the temperature gradient experienced by the AC bridge.

In addition to the DC signal conditioning described above, the output of the AC bridge is fed to a high pass filter (5) and sent to a synchronous demodulator (6) (or other means of rectification), and amplifier. This output signal (7) is proportional to the sum of the temperature gradient effects and the physical parameter being measured. By subtracting the output of the DC signal conditioner from the output of the AC signal conditioner, the temperature gradient effects are eliminated, as long as the gain of the AC system is the same as the gain of the DC system. One method to achieve this is to use a difference amplifier to subtract the output from the DC circuit from the output of the AC circuit. The result is an output that is independent of the effects of temperature (9). A second method would involve using a microprocessor to measure the AC and DC outputs and to scale the values appropriately and do the difference in software. The output of the DC circuit is proportional to the DC resistance of the winding, while the output of the AC circuit is proportional to the sum of the AC resistance (at the excitation frequency) and DC resistance of the leadwire.

This can be illustrated by the following equations:

*ACp Output=2\*pi\*F\*Lsens+Rdc*

*DC Output=Rdc*

*Final Output=ACp Output−DC Output=2\*pi\*F\*L*

Definitions:
pi=3.1415 . . .
Rdc=DC resistance of the sensor
Lsens=Inductance of sensor
F=Frequency of excitation to the inductive sensor.

Another embodiment of the invention would utilize an AC signal as opposed to DC signal for the secondary bridge drive. In this case, instead of the DC drive (2), we would utilize a secondary AC (Fs) drive signal that would be significantly lower than the primary AC (Fp) drive signal (10). The low pass filter (3) would have a cutoff frequency that would pass the secondary drive signal, but filter the primary drive signal. The output of the low pass filter would be the bridge output at the secondary drive frequency. This output would be fed to a secondary synchronous demodulator (12). The output of the synchronous demodulator would be fed to the difference amplifier (8) and subtracted from the output of the primary AC synchronous demodulator output. In this embodiment of the invention, this system could be used for other sensors that require synchronous demodulation, such as capacitive sensors.

New definitions:
Fp=Primary frequency of excitation to the inductive sensor.
Fs=Secondary frequency of excitation to the inductive sensor.
ACp Output=2\*pi\*Fp\*Lsens+Rdc
ACs Output=2\*pi\*Fs\*Lsens+Rdc
Final Output=Acp Output−Acs Output=2\*pi\*Lsens\*(Fp−Fs)

The above equation illustrates that the output is proportional to the inductance and is independent of the DC resistance.

The addition of a summing amplifier (12a) following the low pass filter allows us to have a direct measure of the temperature, as opposed to the temperature gradient provided at the output of the DC instrumentation amplifier (12). This allows the option for additional temperature compensation, such as span error compensation, if desired. The output of the DC instrumentation amplifier can be fed to a microprocessor for span correction, or alternatively, it could be used as an input to a voltage controlled amplifier for span compensation.

Figure 4:
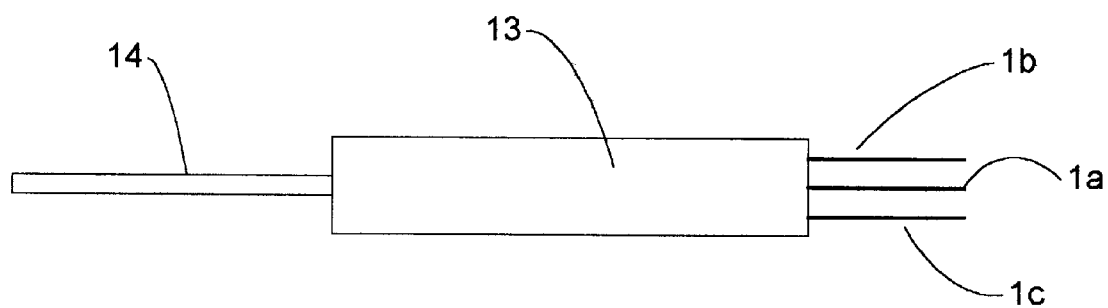
FIG. 4 is a perspective view showing a core type differential variable reluctance transducer assembly that can use the invention.
Figure 5:
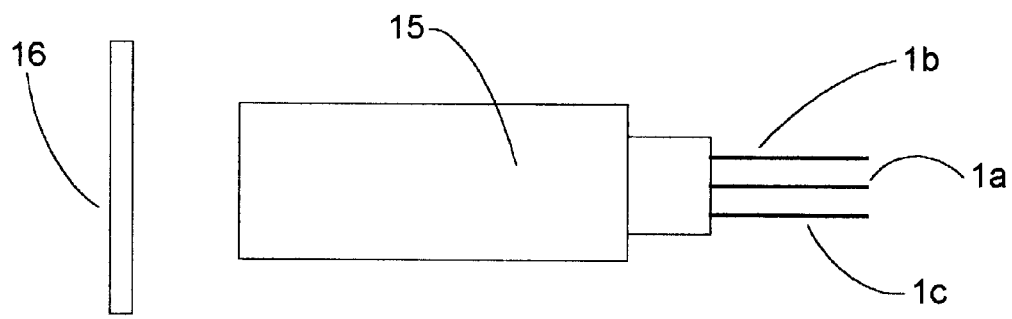
FIG. 5 is a perspective view showing a coil encapsulated in sensor housing measuring the distance from a conductive or ferrous housing.

FIGS. 4 & 5 illustrate two types of inductive displacement sensor that this invention could be applied to. The first (FIG. 4) illustrates a core type DVRT, which utilizes two coils encapsulated inside of a sensor body (13) to differentially detect the change in position of an independent core which houses a ferrous or conductive core (14), which slides freely inside of the coils. The second example (FIG. 5) uses a coil encapsulated within a sensor housing (15) to sense the distance from a conductive or ferrous target (16). In this configuration a compensating coil is packaged within the sensor housing to allow for a differential bridge configuration. In the case of the ferrous target the inductance increases as the coil is brought in closer proximity to the target. In the case of an aluminum target the inductance of the coil is reduced, due to a field that is produced by eddy currents that are generated in the conductive target. The lead wires (1a), (1b), and (1c) are wired into a circuit to complete a wheatstone bridge. This bridge serves as the AC bridge (1) described in the above text.

Figure 2:
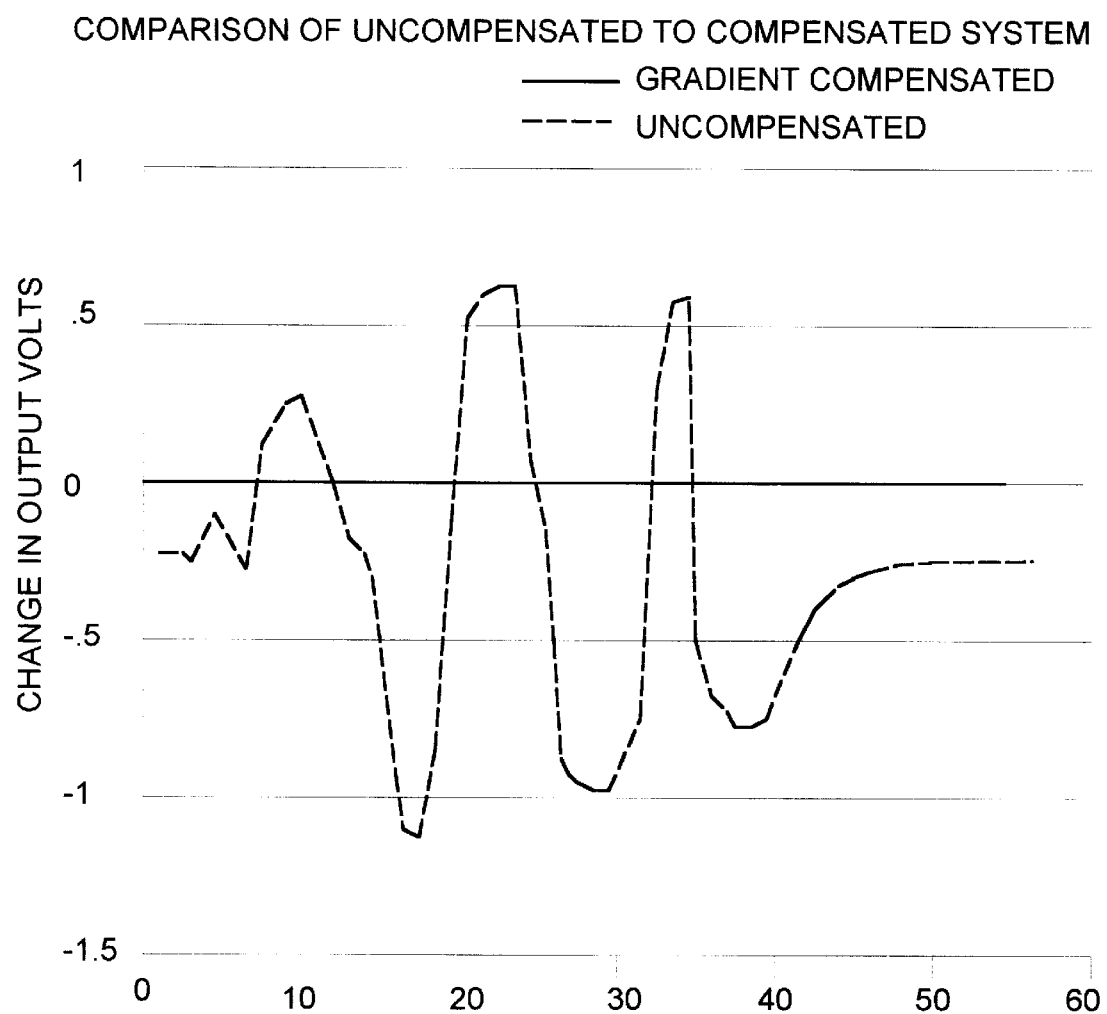
FIG. 2 is a chart comparing a compensated system with an uncompensated system.
Figure 3:
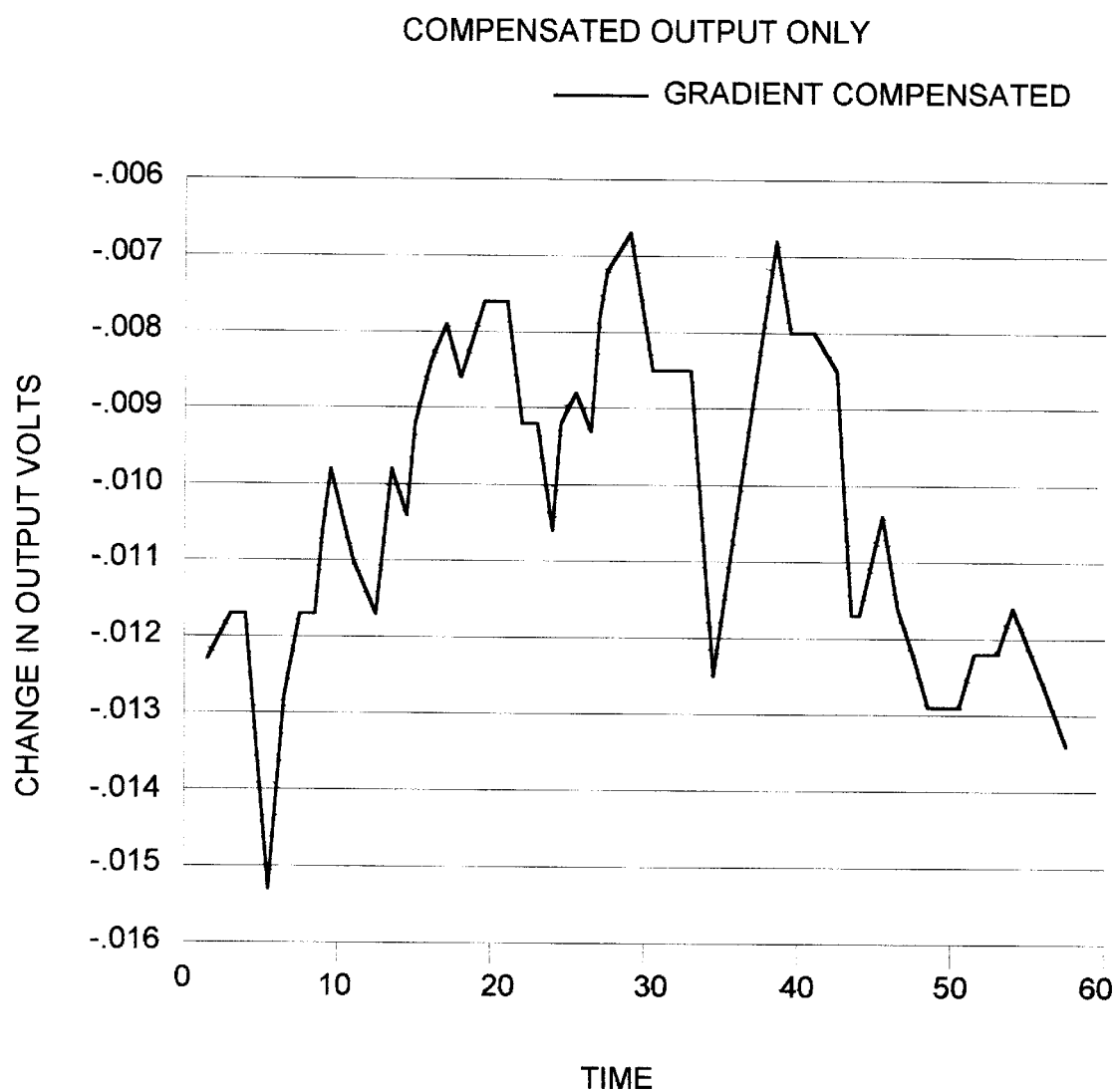
FIG. 3 is a chart showing the output of a compensated system only.

A test circuit that implemented circuit functions described above was constructed and used for testing and validation of the concept. A DVRT as in (15) was used as the sensor input. A temperature gradient of approximately ±40 degrees F. was applied to the sensor three times over a forty second time period. Following is a graph of compensated versus uncompensated output when the temperature gradient is applied (FIG. 2), illustrating the effectiveness of the compensation method when using an inductive transducer. The uncompensated system shifted more than 1.5 volts and exhibited a direct correlation to the temperature gradient. The compensated system showed very little output shift (FIG. 3), and exhibited no correlation to the temperature gradient.

While we have described our invention in connection with specific embodiments thereof, it is clearly to be understood that this is done only by way of example and not as a limitation to the scope of our invention as set forth in the objects thereof and in the appended claims.

We claim:

1. A temperature gradient compensation circuit, for use in the measurement of circuit impedance's such as inductance for use in sensors and transducers used in medical and industrial research applications to measure strains and displacement in inaccessible areas where temperature gradient may exist, comprising:

an impedance bridge circuit;

said impedance bridge circuit having at least two power supplies, each with a different frequency;

said impedance bridge circuit further having a low pass filter for removing the signal generated by the higher frequency power supply;

said impedance bridge circuit further having a high pass filter for removing the signal generated by the lower frequency power supply;

said impedance bridge circuit further having a demodulator positioned after each of said filters to convert the alternating current signal into a direct current signal proportional to the magnitude of the alternating current signal; and means for measuring the difference from the output of the demodulators.

2. A temperature gradient compensation circuit, according to claim 1, wherein:

said impedance bridge circuit comprises an inductor.

3. A temperature gradient compensation circuit, according to claim 1, wherein:

said impedance bridge circuit comprises capacitors.

4. A temperature gradient compensation circuit, according to claim 1, wherein:

said power supplies further comprises one of said power supplies having a frequency of zero.

5. A temperature gradient compensation circuit, according to claim 1, wherein:

said filters have amplification means; and said amplification means having a gain adjustment circuit for controlling the interference of the signal being measured.

6. A temperature gradient compensation circuit, according to claim 1, wherein:

said high pass filter further having an amplifier for increasing the level of the output of the high pass filter.

7. A temperature gradient compensation circuit, according to claim 1, wherein:

said means for measuring the difference from the output of the demodulators comprises the use of an instrumentation amplifier.

8. A temperature gradient compensation circuit, according to claim 1, wherein:

said means for measuring the difference from the output of the demodulators comprises the use of a microprocessor and controlling software.

* * * * *